May 10, 1932.  C. W. McKINLEY  1,857,652
OIL FILTER
Filed March 27, 1929
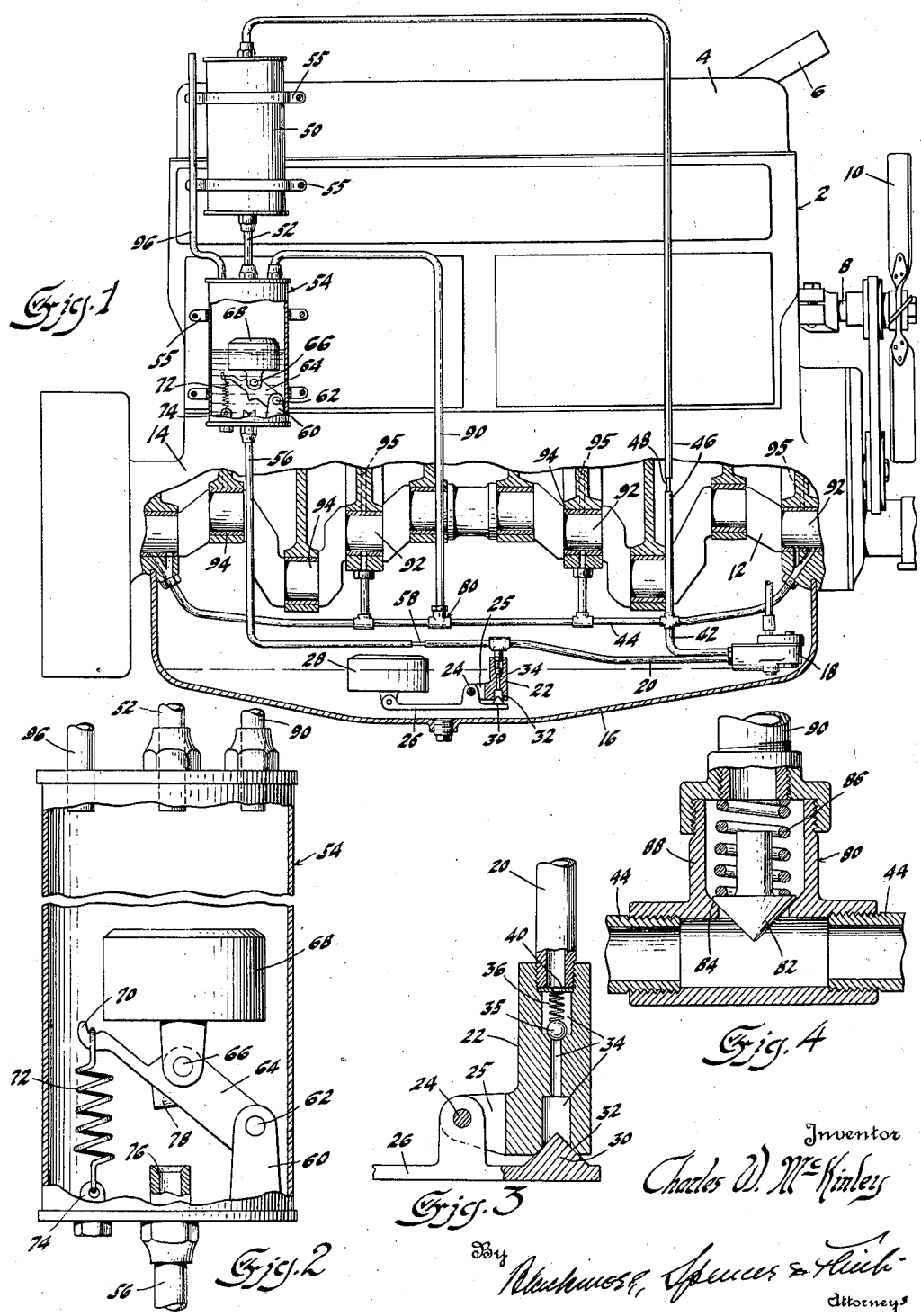

Patented May 10, 1932

1,857,652

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

OIL FILTER

Application filed March 27, 1929. Serial No. 350,297.

This invention relates to lubricating systems and has particular reference to the lubricating systems of internal combustion engines used on automotive vehicles.

In existing lubricating systems it is customary to retain the main portion of the oil or lubricant in the oil pan beneath the crank case. The oil pump is usually positioned in the oil pan and withdraws the oil as needed to deliver the lubricant to the various working parts. The storing of the greater portion of the lubricant in the oil pan exposes a large quantity of oil to contamination, dilution, and deterioration due to heat. It also exposes a large surface of oil to catch dust particles, grit, etc. It is the object of the present invention to very materially reduce the amount of oil kept in the oil pan and store the lubricant in an auxiliary receptacle or reservoir in order to remove the possibility and likelihood of contamination, dilution and deterioration. The invention also aims to keep a constant level of the oil in the oil pan and thereby limit the amount of lubricant which remains in the oil pan and is exposed to deleterious effects.

The object of the invention is accomplished by providing the usual inlet to the pump with a float controlled valve which will close when the level in the oil pan descends below a predetermined height. A filter is used which is connected to the oil pump and has connected thereto the receptacle or container of the present invention which is adapted to receive the filtered oil. The receptacle in turn has a connection with the oil pump. Restrictions are placed in both the flow lines or the connection from the pump to the filter and from the receptacle to the pump in order to limit and control the flow of oil therethrough. Inside the receptacle there is also positioned a float controlled valve which will close when the receptacle is empty, the function of which is to prevent the drawing of air into the oil line. The pump also delivers oil to the usual manifold connected to the crank shaft bearings and in this oil line there is positioned a pressure relief valve having a flow connection to the receptacle, in order that excess oil delivered from the pump may be suitably passed to the receptacle and to relieve the oil lines of excess pressure. The inlet from the oil pan to the pump is provided with a one way valve to prevent the return of oil from the receptacle or pipe lines to the oil pan. When the system is in full operation the pump will withdraw oil from both the oil pan and the receptacle but favors the oil pan because of the restriction in the flow line from the receptacle, so that while the tendency is to draw more oil from the oil pan the quantity withdrawn therefrom is limited by the float and valve controlling the oil pan pump inlet. The amount withdrawn from each source will soon balance itself so the same substantially constant proportion will be withdrawn from the receptacle and oil pan, with the greater portion coming from the receptacle.

The invention also has the advantage of storing the greater quantity of oil in a receptacle where by a suitable arrangement it may be subjected to the heating effects of the exhaust gases of the engine or the hot water of the circulating system, or the cooling effects of an air blast or in the colder water of the circulating system, depending on whether it is desired to heat or cool the oil.

On the drawings:

Fig. 1 is a side view of an internal combustion engine with parts in section showing the application of the invention.

Fig. 2 is an enlarged sectional view of the auxiliary receptacle.

Fig. 3 is an enlarged view of the float valve in the oil pan and the one way valve in the pump suction line.

Fig. 4 is a sectional detail view of the pressure relief valve and its interconnected piping.

Referring to the drawings the numeral 2 indicates an internal combustion engine as a whole, 4 the cylinder head, 6 the water circulating system, 8 the fan shaft, 10 the fan, 12 the crank shaft, 14 the crank case, 16 the oil pan, and 18 the oil pump, which parts are conventional and form no part of the invention except insofar as they relate to the combination.

The oil pump 18 has the suction line 20 which receives its oil from the oil pan 16. As is better shown in Fig. 3, the suction line 20 terminates in the valve housing 22 which has pivoted thereto as at 24 on a forked arm 25 the lever 26 of a float 28. The opposite end of the lever 28 is provided with a valve 30 adapted to rest on the seat 32 in closed position. The valve housing 22 is provided with the usual conduit or bore 34 leading to the suction line 20 and also has the ball valve 35 held against its seat by means of a spring 36 retained at one end by means of a cross rod, or a disc 40 provided with a suitable opening to allow for the passage of oil. As will be apparent from an examination of Figs. 1 and 3, when the oil level in the pan 16 rises, the float 28 will rise and lift the valve 30 from its seat 32 to open wider the mouth of the bore 34 and accordingly permit a proportionately greater amount of oil to be withdrawn by the pump. As the oil level in the pan falls the float will fall and tend to close the opening in the bore 34 and therefore restrict the amount of oil withdrawn by the pump.

The pump is provided with a delivery line 42 which leads to the manifold 44 and to the oil filter 46. The oil filter line 46 has a restriction indicated diagrammatically at 48 to limit the amount of oil passed to the filter 50.

The filter 50 is mounted at any suitable place such as the engine or dash board and has the outlet pipe 52 which delivers into a receptacle or container 54 preferably positioned directly beneath the filter although it may be mounted at any suitable place that will permit the filtered oil to flow by gravity thereto. The brackets 55 are for the purpose of mounting or securing the filter and receptacle. A flow connection or pipe line 56 leads from the bottom of the receptacle 54 to the suction line 20 and is provided with a suitable restriction indicated diagrammatically at 58. The purpose of this restriction is to limit the flow of oil from the container 54 and to cause the pump to tend to pull the greater amount of oil from or favor the oil pan when the valve 30 is off its seat. As the valve 30 tends to close the opening in the bore 34 when the oil level falls, the pump 18 will balance its withdrawal of oil from the receptacle 54 and from the oil pan in accordance with the oil level in the pan 16, drawing substantially the constant same proportionate amount of oil from each source when the engine is in normal running condition. If for any reason the valve 30 should be tightly held against its seat, all of the oil will be withdrawn from the receptacle 54.

Inside the receptacle there is secured preferably to its bottom the arm 60 which has pivoted thereto at 62 the lever 64, to which there is pivoted as at 66 the float 68. The lever has secured to its hooked end 70 one end of the coil spring 72, the lower end of which is secured to an eye 74 fastened to the bottom of the receptacle 54. The terminus of the pipe or flow connection 56 inside the container 54 is formed into a seat 76 on which there is adapted to fit the valve 78 formed on the arm 64. As the liquid or oil in the receptacle 54 rises the float 68 will raise the valve 78 off its seat against the tension of the spring 72 to permit a free oil flow. However, if the oil level falls below the level of the seat 76 the spring 72 will tightly hold the valve 78 against its seat, the purpose of which is to prevent the pump 18 withdrawing air into the suction line 20 through the flow connection 56.

The manifold 44, which is directly connected to the pump outlet 42, has positioned therein as at the T connection 80 a one way pressure relief valve 82 shown in detail in Fig. 4. The pressure relief valve is held on its seat 84 by means of a coil spring 86 enclosed in the leg 88 of the T connection 80. Leading from the pressure relief valve to the receptacle 54 is a pipe or flow connection 90 which delivers excess oil from the pump to the receptacle instead of returning it to the oil pan as is conventional in present lubricating systems.

The operation of the lubricating system is as follows:

Assuming that the pump 18 is working it will pull oil into the suction line 20 from both the oil pan 16 through the bore 34, and from the oil reservoir or receptacle 54 through the flow connection 56. The amount of lubricant withdrawn from the two branches will depend upon the position of the float 28 and its valve 30. If for any reason the level in the oil pan rises the float will unseat the valve 30 relatively far from its seat to open wide the mouth of the bore 34 to permit the greater portion of oil to be withdrawn from the oil pan the restriction 58 impeding the oil flow from the receptacle. However, as the level in the pan falls, the valve will be forced closer to its seat which will cause an increasing proportionately larger amount of oil to be drawn through the flow connection 56 from the receptacle. After a very short time the pump will balance the amount of oil withdrawn from the two and obtain a same proportionate amount of oil from both connections. The oil from the pump will be delivered to the outlet 42 into the manifold 44 and into the oil filter line 46. However, due to the restriction 48 in the filter oil line, only a limited amount of oil will be permitted to flow to the filter 50. The filtered oil will of course flow to the receptacle 54 through the pipe connection 52. From the manifold 44 the oil will flow to the crank shaft bearings 92 to the connecting rod bearings 94 and to the cam shaft (not shown) preferably through a rib in the crank case at one of the bearings 92, as shown at 95. Any excess pressure in the oil line will cause the unseating of the valve 82 in the T connection 80 and cause the oil to flow through the flow connection or pipe 90 to the upper portion of the tank or receptacle 54. The lubricant in the receptacle 54 is of course returned to the suction line 20 through the flow connection 56.

A vent 96 permits atmospheric pressure to be maintained in the tank or receptacle 54.

As a result of the arrangement of the present invention the amount of oil in the oil pan is very much less than is the case with internal combustion engines now in use, and there is therefore a much less exposure of oil to contamination and less likelihood of deterioration due to heat from the engine. The oil in the receptacle 54 is also capable of regulation by a suitable system of oil cooling.

I claim:

1. In combination with an engine having a lubricating system including an oil pan, a pump in the system to withdraw oil from the pan, an oil filter adapted to receive lubricant from the system, a receptacle having a flow connection from the filter to receive lubricant therefrom, a flow connection from the system to the receptacle, and a flow connection from the receptacle to the pump.

2. In combination with an engine having a lubricating system including an oil pan, a pump in the system for withdrawing oil from the oil pan, an oil filter, a flow connection in the system delivering oil to the filter, a storage receptacle, flow connections to the receptacle from the system and from the filter, a flow connection from the receptacle to the pump, and a valve to control the flow thru the connection.

3. In combination with an engine having a lubricating system including an oil pan, a pump to withdraw oil from the pan, an oil filter, a flow connection for delivering oil from the system to the filter, a receptacle in said system, a flow connection to cause a flow of oil from the filter to the receptacle, a flow connection from the pump to the receptacle, and a flow connection from the receptacle to the pump.

4. In combination with an engine having a lubricating system including an oil pan, a pump in the system for withdrawing oil from the oil pan, a filter, a flow connection for delivering oil from the system to the filter, a receptacle in said system, a flow connection to cause the flow of oil from the filter to the receptacle, a flow connection from the pump to said receptacle, means in said connection to control the flow of oil from the pump, and a flow connection from the receptacle to the pump.

5. In combination with an engine having a lubricating system including an oil pan, a pump in the system for withdrawing oil from the oil pan, a filter, a flow connection for delivering oil from the system to the filter, a receptacle in the system, a flow connection to cause the flow of oil from the filter to the receptacle, a flow connection from the pump to the receptacle, a flow connection from the receptacle to the pump, and means in both connections to control the flow.

6. In combination with an engine having a lubricating system including an oil pan, a pump for withdrawing oil from the pan, a filter, a flow connection from the pump to the filter, a receptacle in the system, a pipe between the filter and receptacle to cause oil to flow to the receptacle from the filter, a flow connection from the pump to the receptacle, and a flow connection from the receptacle to the pump.

7. In combination with an engine having a lubricating system including an oil pan, a pump for withdrawing oil from the pan, a filter, a flow connection from the pump to the filter, a receptacle in the system, a pipe between the filter and receptacle to cause oil to flow to the receptacle from the filter, a flow connection from the pump to the receptacle, a flow connection from the receptacle to the pump, and means in said connections to control the flow of oil.

8. In combination with an engine having a lubricating system including an oil pan, a pump for withdrawing oil from the pan, a flow connection from the pan to the pump, a filter, a flow connection from the pump to the filter, a receptacle connected to the filter to receive oil therefrom, a flow connection from the pump to the receptacle, and a flow connection from the receptacle to the pump.

9. In combination with an engine having a lubricating system including an oil pan, a pump for withdrawing oil from the pan, a flow connection from the pan to the pump, a filter, a flow connection from the pump to the filter, a receptacle connected to the filter to receive oil therefrom, a flow connection from the pump to the receptacle, a flow connection from the receptacle to the pump, and means in said connections to control the flow of oil.

10. In combination with an engine having a lubricating system including an oil pan, a pump for withdrawing oil from the pan, a flow connection from the pan to the pump, a float controlled valve controlling said connection, a filter adapted to receive oil from the system, a receptacle connected with the filter to receive oil therefrom, a flow connection from the pump to the receptacle, and a flow connection from the receptacle to the pump.

11. In combination with an engine having a lubricating system including an oil pan, a pump for withdrawing oil from the pan, a flow connection from the pan to the pump, a float controlled valve controlling said connection, a filter adapted to receive oil from the system, a receptacle connected with the filter to receive oil therefrom, a flow connection from the pump to the receptacle, a restriction in said last named flow connection, and a flow connection from the receptacle to the pump.

12. In combination with an engine having a lubricating system including an oil pan, a pump for withdrawing oil from the pan, a flow connection from the pump to the pan, a float controlled valve controlling said connection, a filter, a flow connection from the pump to the filter, a restriction in said filter connection, a lubricant receptacle adapted to receive oil discharged by the filter, a flow connection from the filter to the receptacle, and flow connections from the pump to the receptacle and from the receptacle to the pump.

13. In combination with an engine having a lubricating system including an oil pan, a pump for withdrawing oil from the pan, a flow connection from the pump to the pan, a float controlled valve controlling said connection, a filter, a flow connection from the pump to the filter, a restriction in said filter connection, a lubricant receptacle adapted to receive oil discharged by the filter, a flow connection from the filter to the receptacle, flow connections from the pump to the receptacle and from the receptacle to the pump, and means in said last named connections to control the flow of oil.

14. In combination with an engine having a lubricating system including an oil pan, a pump for withdrawing oil from the pan, a flow connection between the pump and pan, a filter, a flow connection between the pump and filter including a restriction to limit the oil flow to the filter, an oil receptacle receiving oil from the filter, a flow connection from the filter to the receptacle, a flow connection from the pump to the receptacle including a one way valve to prevent back oil flow to the pump, and a flow connection from the receptacle to the pump including a restriction.

15. In combination with an engine having a lubricating system including an oil pan, a pump for withdrawing oil from the pan, a flow connection between pan and pump, a valve in said connection controlled by a float operated by the liquid level in the oil pan, a filter, a flow connection between the pump and filter, a receptacle for receiving oil from the filter, a flow connection from the filter to the receptacle, flow connections from the pump to the receptacle and from the receptacle to the pump, said flow connection from the pump to the receptacle delivering excess oil to the receptacle.

16. In combination with an engine having a lubricating system including an oil pan, a pump for withdrawing oil from the pan, a flow connection between pan and pump, a filter, a flow connection between the pump and filter, a receptacle receiving oil from the filter, a pressure relief valve in said system, a flow connection beyond said relief valve leading to the receptacle, and a flow connection leading from the receptacle to the pump.

17. In combination with an engine having a lubricating system including an oil pan, a pump for withdrawing oil from the pan, a flow connection between the pan and pump, a filter, a flow connection between pump and filter, a lubricant receptacle receiving oil from the filter, flow connections from the pump to the receptacle and from the receptacle to the pump, and means in said connections to control the oil flow.

18. In combination with an engine having a lubricating system and an oil pan, a pump for withdrawing oil from the pan, a flow connection between the pan and pump, a valve in said connection, a float operated by the liquid level in the pan for controlling said valve, a second valve in said connection preventing the return of oil to the pan, a filter, a flow connection from the pump to the filter including a restriction, a lubricating receptacle, a flow connection from the filter to the receptacle, a flow connection from the pump to the receptacle including a one way pressure relief valve, a flow connection from the receptacle to the pump including a restriction, and a float operated valve in said receptacle adapted to close the pump connection when the receptacle is empty.

In testimony whereof I affix my signature.

CHARLES W. McKINLEY.